Figure 1:
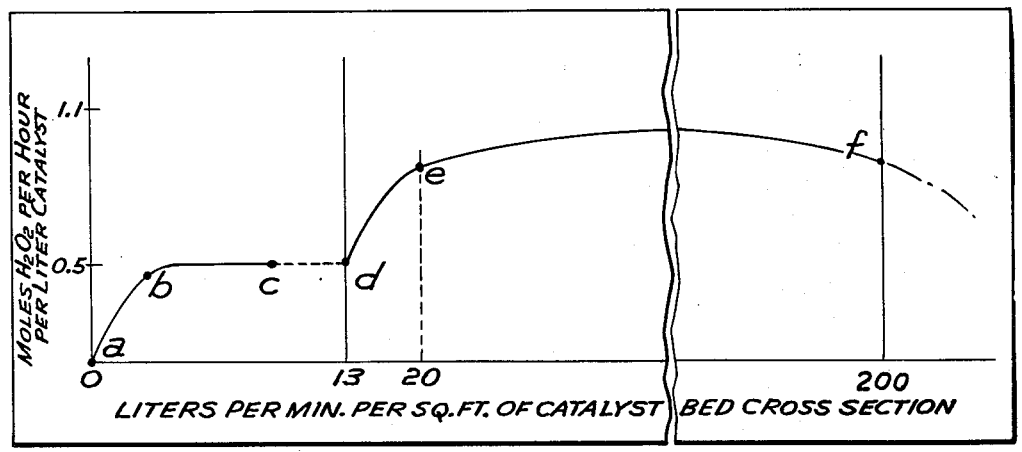

Nov. 21, 1961     D. H. PORTER     3,009,782
PRODUCTION OF HYDROGEN PEROXIDE BY ANTHRAQUINONE PROCESS
IN THE PRESENCE OF A FIXED BED CATALYST
Filed May 22, 1958

INVENTOR:
DONALD H. PORTER
BY:
Beau, Brooks, Buckley & Beau,
ATTORNEYS.

United States Patent Office 3,009,782
Patented Nov. 21, 1961

3,009,782
PRODUCTION OF HYDROGEN PEROXIDE BY ANTHRAQUINONE PROCESS IN THE PRESENCE OF A FIXED BED CATALYST
Donald H. Porter, Tonawanda, N.Y., assignor to FMC Corporation, a corporation of Delaware
Filed May 22, 1958, Ser. No. 737,126
3 Claims. (Cl. 23—207)

This invention relates to the manufacture of hydrogen peroxide by the so-called anthraquinone process and particularly to such a process in which the hydrogenation stage is performed in the presence of a catalyst supported in a fixed bed.

Heretofore it has been proposed to prepare hydrogen peroxide by reduction of an alkylated anthraquinone, the so-called working material, to produce the hydroquinone form of that working material and subsequently to oxidize the hydroquinone form of the working material with air or other source of oxygen to produce the quinone form of the working material and hydrogen peroxide, the latter being separated from the working solution, generally by water extraction.

Commercial production of hydrogen peroxide by the so-called anthraquinone process has been facilitated by the employment of a mixed solvent for the working material, namely, a solvent containing a constituent for dissolving the quinone form of the working material, and a constituent for dissolving the hydroquinone form of the working material.

The early development of such mixed solvent is described in patents to Pfleiderer and Riedel No. 2,158,525 and No. 2,215,883, as well as in certain Publication Board Reports, such as PB 4336.

It would appear that the hydrogenation of the quinone form of the working material presents particular problems by reason of the fact that during the hydrogenation stage, concurrent and undesired reduction reactions proceed with the main reduction the latter being reduction of the quinone group to the hydroquinone group. The hydrogenation of the working material is effected in the presence of a hydrogenation catalyst, such as Raney nickel or a noble metal supported upon an inert carrier and, the wanted reduction reaction, by reason of ancillary activity of the catalyst in inducing other hydrogenation reactions, is less than theoretical.

Such ancillary reducing reactions may produce nuclear hydrogenation of the aromatic nucleus of the working material with the production of a tetrahydro derivative thereof. There may also be produced unwanted and undesirable nonusable by-products, that is, by-products in which the capacity of the quinone group to be alternately reduced and oxidized, has been lost. All of these undesirable reduction reactions, it is believed, proceed at a slower rate than the wanted reduction reaction, and appear probably to be due to excessive time of contact with the hydrogenation catalyst.

It is an object of the present invention to provide an improved anthraquinone process wherein a minimum of nonusable by-products is obtained during the conversion of quinone form of working material to hydroquinone form of working material, in the hydrogenation stage of the process.

It is a further object of the invention to provide a hydrogenation procedure wherein contact between the working material and the catalyst in the presence of hydrogen is reduced to a minimum.

It is a further object of the invention therefore to increase the usable life of the working material, to reduce degradation thereof and to increase the amount of hydrogen peroxide producible per pass through the equipment employed in the anthraquinone process.

In the broad concept of the present invention, a working material which is an alkylated anthraquinone, well known in the art, is dissolved in any of the conventional and suitable solvents. These working materials may be any of 2-ethyl, 2-isopropyl, 2-sec.-butyl, 2-t-butyl-, 2-sec.-amyl-, 1,3-dimethyl-, 2,3-dimethyl, 1,4-dimethyl, and 2,7-dimethyl-anthraquinone, among others. The corresponding tetrahydroanthraquinones may also be employed, examples of which are tetrahydro-2-ethylanthraquinone and tetrahydro-2-tertiary-butylanthraquinone, as may mixtures of the above.

In general, the solvent will be a so-called mixed solvent and contain a constituent for dissolving the hydroquinone form of the working material and a constituent for dissolving the quinone form of the working material. These solvents are well known in the art and there is employed in the present invention any conventional solvent. Some of the commercially employed solvents are described in U.S. Patents 2,215,883, 2,537,516, 2,537,655, 2,768,065, 2,768,066, 2,657,980 and British Patent 769,-515, among others.

As catalyst, there is employed in the present invention, any of the suitable catalysts known to foster the reduction of the quinone group to the hydroquinone group, as for instance Raney nickel or one of the noble metals ruthenium, rubidium, platinum, rhodium or palladium. Palladium being one of the commercially better known catalysts for use in the anthraquinone process, is illustrated herein as the catalyst employed, and when so employed is present upon a catalyst carrier and in a fixed bed in contrast to the commercial utilization of hydrogenation catalysts in very finely divided form suspended in the working solution, all as exemplified in Hinegardner U.S. Patent 2,689,169, and in Sprauer U.S. Patent 2,657,980.

In accordance with the teachings of this invention, it is desired that the catalyst and working solution have a relatively short time of contact in the presence of hydrogen. In order to effect this, the catalyst, that is the carrier and supported metal, is selected as to average particle size thereof to a close tolerance with a mesh size of from about 4 mesh to about 100 mesh. The working solution should be passed rapidly over and through such a catalyst bed at a very high rate of feed, preferably between 20 liters to 200 liters per minute per square foot of catalyst bed cross-sectional area. The temperature of hydrogenation may be the conventional temperatures employed, namely, from about room temperature to about 100° C. although it is suggested that the temperature be maintained in the lower ranges.

In order to effect hydrogenation, hydrogen gas may be dissolved in the working solution or admitted to the hydrogenator so long as contact be obtained between the hydrogen gas and the working solution in contact with the catalyst and, in this mode of operation, the catalyst will be surrounded by working solution. As is known in the art, the hydrogen pressure may vary for somewhat below atmospheric to approximately 25 atmospheres.

The procedures specifically described herein are applicable to general hydrogenation of the alkylated anthraquinones using metal or the noble metal catalysts, such as ruthenium, rubidium, platinum, rhodium, palladium, upon a support, so that a fixed bed can be prepared thereon containing catalyst particles of 4 to 100 mesh size. Such supports may be carbon, the carbonates of the alkaline earth metals, such as magnesium carbonate, calcium carbonate, strontium carbonate and barium carbonate, the carbides such as magnesium carbide, silicon carbide, aluminum carbide, titanium carbide and zirconium carbide, and the oxides of magnesium, silicon, aluminum, titanium and zirconium.

Figure 2:
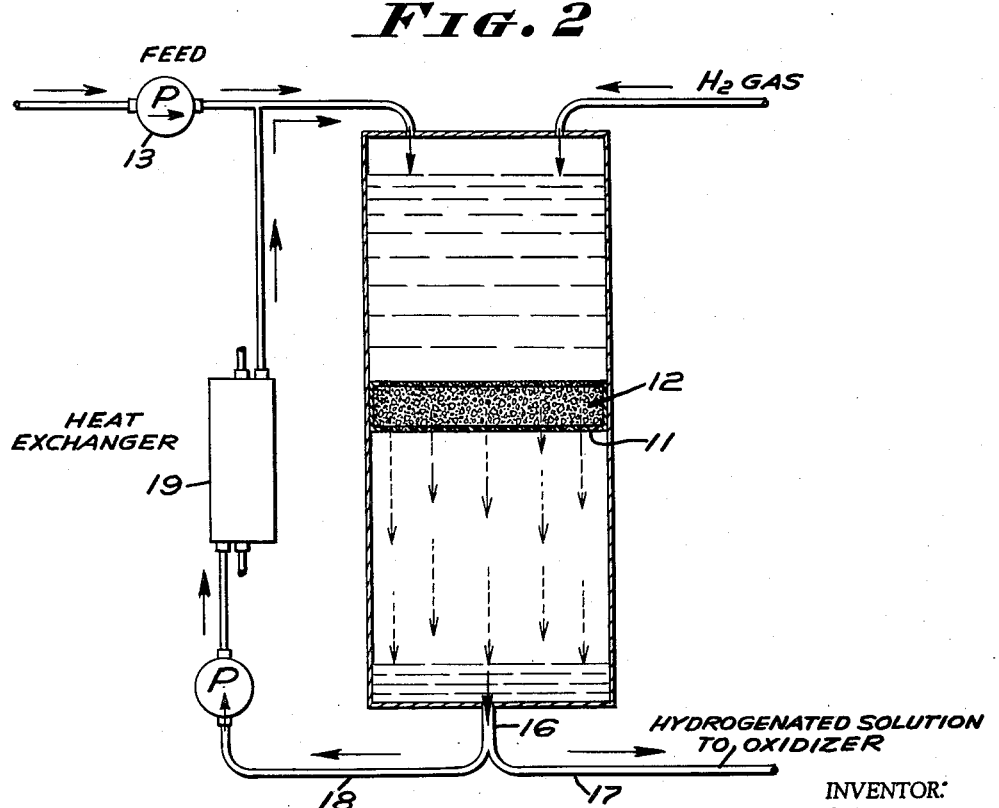

In the drawing, FIG. 1 is a graph illustrating the change in the productivity of hydrogen peroxide with change in the flow of the working solution through the bed expressed in liters per minute per square foot of catalyst bed cross-section, while FIG. 2 is a diagrammatic illustration of the operation of the present invention.

In a series of experiments, a given working solution of a stated composition of working material and working solvent was passed in contact with hydrogen gas, at constant pressure, through a fixed bed of palladium catalyst and it was determined that a relatively constant amount of the hydroquinone form of the working material could be produced at moderate flow rates of the solution and hydrogen over the catalyst. This is shown at b—c—a in the curve of FIG. 1.

However, when the flow rate exceeded about 13 liters per minute per square foot of catalyst area, the amount of hydroquinone produced increased relatively rapidly until a constant and maximum was reached at a flow rate of 20 liters per minute. The amount of hydroquinone produced remained substantially at this constant and maximum level for flow rates up to about 200 liters per minute per square foot of catalyst area. These data are represented in FIG. 1 by plotting the flow rate in liters per minute per square foot of catalyst cross-sectional area against the amount of hydrogen peroxide which may be produced therefrom. The data represented by FIG. 1 on the line a—b—c—d corresponds to production heretofore known to be available from the prior art. Thus, on increasing the velocity rate, as shown by the curve on the portions a—b, it was known that an increase in hydrogen peroxide was obtainable until a relatively constant figure was obtained as is shown in portion of curve b—c.

However, in accordance with the present invention, the flow rate was increased beyond rates heretofore considered, and, from a flow rate of about 13 liters per minute per square foot of catalyst bed area, the yield of peroxide was increased rapidly with increasing flow rate, up to a flow rate of about 20 liters per minute per square foot of bed cross-section. At the 20 liters per minute per square foot rate, the yield of peroxide reached is at a relatively constant and maximum level such that at flow rates of between 20 to 200 liters per minute per square foot of cross-section of catalyst bed, the yield of peroxide remains at a high level. This is because the increased flow rate induces an increase in concentration of hydroquinone form and therefore, in direct proportion, an increase in hydrogen peroxide yield as shown on the curve d—e—f.

Referring to FIG. 2, a hydrogenator column is shown generally at 10 which is equipped with a fixed bed 11 filled with granular catalyst 12 of the type hereinabove described, the mesh size of which is within the limits 4 to 100 mesh.

Hydrogenator 10 is equipped at 13 with a feed line and pump carrying the recycled, extracted and dried working solution for inclusion in the cycle. The hydrogenator is also equipped with means for admitting hydrogen gas. It is here shown as being admitted directly to the hydrogenator rather than being introduced into the working solution ahead of the hydrogenator. In the operation as shown, gaseous hydrogen is present in the top of the hydrogenator and in direct contact with the surface of the working solution.

Hydrogenator 10 is also shown as equipped with a discharge 16 and a conduit 17 for carrying hydrogenated solution for subsequent treatment, namely, to an oxidizer (not shown), and then to an extractor (not shown).

Discharge conduit 16 is also provided with a recycling conduit 18 which is provided with a heat exchanger 19 whereby a portion of the discharge from hydrogenator 10, i.e., hydrogenated working solution, may be passed through the cooler 19 and enter the hydrogenator to mix with the fresh feed so that now the feed to the hydrogenator comprises a portion of fresh, unhydrogenated working solution, and a portion of solution which has been hydrogenated.

In accordance with the present invention it is advantageous to recycle a large proportion of the effluent from the hydrogenator as it has been found that more efficient use of the catalyst for its intended purpose is thereby obtained. The flow rate should be within the range 20 liters per square foot of catalyst cross-sectional area per minute to 200 liters per square foot per minute.

The following example is given merely as illustrative and not as limitative of the invention.

*Example 1*

The following is a specific example illustrating the operation of the process of the present invention wherein the working material was a mixture of 2-ethylanthraquinone and the tetrahydro derivative thereof. The working solvent consisted of approximately 60% by volume of dimethylnaphthalene and 40% by volume of trioctyl phosphate and contained in one liter, 105 grams of working material. The working material was approximately 35% 2-ethylanthraquinone and 65% of the tetrahydro derivative thereof arrived at after a considerable period of use.

The working solution was passed over a fixed bed of catalyst which comprised supported metallic palladium on alumina at an average particle size of 10 mesh. This catalyst had been regenerated several times to a constant activity. After 1152 hours of use, the loss in total active quinine was found to be less than 1.0%. The cycle flow rate was 0.670 liter per minute. The overall average of recycled solution of this fluid was based on feed about 12:1 or 7.7% of the feed constituted fresh solution. By this means, the flow rate through the catalyst bed was maintained at 110 liters per minute per square foot of cross-sectional area.

During the 1152 hour operation, there was produced 370,000 grams hydrogen peroxide. The loss of usable total quinone corresponded to less than 0.001 gram per gram of hydrogen peroxide produced. These results show strikingly that overhydrogenation was maintained at a minimum even though one operates at a high hydroquinone concentration. In general, in accordance with the present operation, the feed to the hydrogenator comprises from about 1% to about 50% or more fresh solution, the remainder being obtained by recycle.

What is claimed is:

1. In the method of producing hydrogen peroxide by the alternate reduction and oxidation of an alkylated anthraquinone as the working material dissolved in a solvent and constituting the working solution, and wherein the working solution is hydrogenated by contact with hydrogen in the presence of a fixed bed of metallic catalyst constituting a noble metal supported on a carrier from the group consisting of magnesium carbonate, calcium carbonate, strontium carbonate, barium carbonate, magnesium carbide, silicon carbide, aluminum carbide, titanium carbide, zirconium carbide, magnesium oxide, silicon oxide, aluminum oxide, titanium oxide and zirconium oxide of substantially uniform cross section aiding the hydrogenation, said catalyst being of 4 to 100 mesh, that improvement which comprises passing the working solution through a fixed bed of said catalyst at a rate of between 20 to 200 liters per minute per square foot of catalyst bed cross-section.

2. Method in accordance with claim 1 wherein a portion only of the working solution discharging from the catalyst bed is sent forwardly in the process, the remainder being recycled to again pass through the catalyst bed.

3. Method according to claim 1 wherein the hydrogen pressure may be 25 atmospheres of hydrogen to somewhat less than one atmosphere absolute.

References Cited in the file of this patent

UNITED STATES PATENTS

| | | |
|---|---|---|
| 2,657,980 | Sprauer | Nov. 3, 1953 |

FOREIGN PATENTS

| | | |
|---|---|---|
| 768,675 | Great Britain | Feb. 20, 1957 |
| 796,461 | Great Britain | June 11, 1958 |

OTHER REFERENCES

Slater et al.: "The Anthraquinone Autoxidation Process for the Production of Hydrogen Peroxide," PB 4336, March 29, 1946, page 17.

UNITED STATES PATENT OFFICE
CERTIFICATION OF CORRECTION

Patent No. 3,009,782                            November 21, 1961

Donald H. Porter

It is hereby certified that error appears in the above numbered patent requiring correction and that the said Letters Patent should read as corrected below.

Column 2, line 13, for "2,3-dimethyl, 1,4-dimethyl," read -- 2,3-dimethyl-, 1,4-dimethyl-, --; column 4, lines 42 and 43, for "quinine" read -- quinone --.

Signed and sealed this 17th day of April 1962.

(SEAL)
Attest:

ESTON G. JOHNSON                                    DAVID L. LADD
Attesting Officer                                      Commissioner of Patents